United States Patent [19]

Ohashi et al.

[11] Patent Number: 5,107,280

[45] Date of Patent: Apr. 21, 1992

[54] DIVISIONAL EXPOSURE APPARATUS

[75] Inventors: Tsuyoishi Ohashi, Hashima; Mineo Hanaki, Nishikasugai, both of Japan

[73] Assignee: Brother Kogyo Kabushiki Kaisha, Nagoya, Japan

[21] Appl. No.: 578,220

[22] Filed: Sep. 6, 1990

[30] Foreign Application Priority Data

Sep. 12, 1989 [JP] Japan ................... 1-237586
Nov. 20, 1989 [JP] Japan ................... 1-301402
Nov. 21, 1989 [JP] Japan ................... 1-302740

[51] Int. Cl.$^5$ .............................................. H04N 1/21
[52] U.S. Cl. ............................ 346/108; 250/235; 359/212
[58] Field of Search ................ 346/108, 107 R, 76 L, 346/160; 358/296, 300, 302; 350/6.5, 6.7, 6.8; 250/235

[56] References Cited

U.S. PATENT DOCUMENTS 4,977,411 12/1990 Pepe ........................ 346/108
5,006,705 4/1991 Saito et al. ................. 250/235

FOREIGN PATENT DOCUMENTS

58-162926 9/1983 Japan .
59-38721 3/1984 Japan .
60-203912 10/1985 Japan .
63-47718 2/1988 Japan .

Primary Examiner—Mark J. Reinhart
Attorney, Agent, or Firm—Oliff & Berridge

[57] ABSTRACT

A divisional exposure apparatus comprises a plurality of exposure devices for dividing the exposure region of a photosensitive element and exposing each divided exposure region by one of the corresponding exposure devices. The exposure signals of the exposure devices are so controlled as to be on the same phase. The scanning directions of the exposure devices are arranged to compensate for the traveling speed of the photosensitive element such that the scanning lines become parallel to the axis of the photosensitive element. The exposure of the region where two adjacent scanning lines connect with each other is controlled to be substantially equal to other exposure regions.

17 Claims, 10 Drawing Sheets

DIVISIONAL EXPOSURE APPARATUS

BACKGROUND OF THE INVENTION

1. Field of the Invention

The present invention relates to a divisional exposure apparatus. More particularly, the present invention relates to a divisional exposure apparatus which divides the exposure region of a photosensitive element and exposes each divided exposure region using one of a plurality of exposure devices.

2. Related Art

A conventional exposure apparatus which exposes a photosensitive element such as a drum-shaped photosensitive element by exposure beams commonly uses a semiconductor laser beam as a light source. In such a conventional exposure apparatus, which exposes a large exposure region of a photosensitive element, a plurality of small, inexpensive exposure devices are used in combination in order to divide a large exposure region and expose each divided exposure region using one of the small exposure devices. Exposure of a large exposure region by a single exposure device will require large, expensive optical parts including condenser lenses, making the exposure apparatus remarkably expensive.

Figure 4:
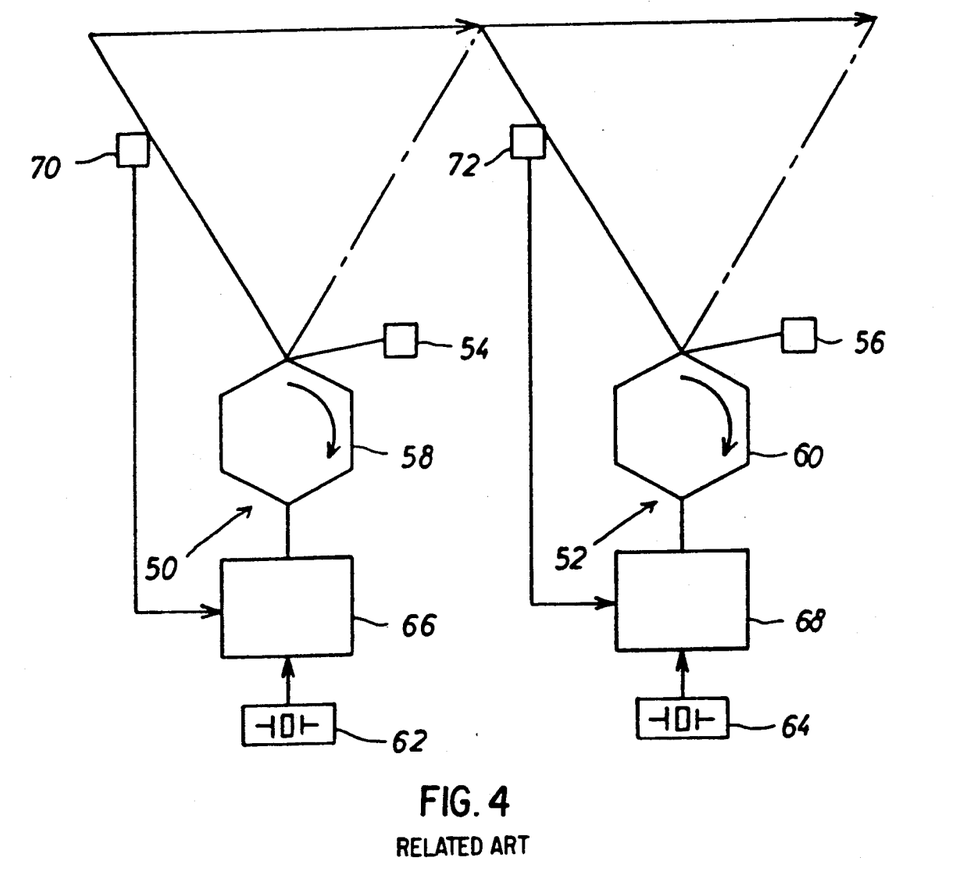
FIG. 4 is a schematic illustration of a related-art divisional exposure apparatus.

As shown in FIG. 4, such a conventional divisional exposure apparatus includes two exposure devices 50 and 52 having a parallel construction: the exposure devices 50 and 52 comprises the same elements, namely, laser beam generators 54 and 56 for generating a laser beam based on an externally provided signal, rotating polygon mirrors 58 and 60 for polarizing the laser beam generated by the laser beam generators 54 and 56, reference signal generation circuits 62 and 64 using crystal oscillation circuits, drive circuits 66 and 68 for rotatably driving the rotating polygon mirrors 58 and 60 at a steady speed based on the signals sent from the reference signal generation circuits 62 and 64, and detectors 70 and 72 for detecting laser beams prior to laser beam exposure based on externally provided timing information.

In operation, the drive circuits 66 and 68 rotate the rotating polygon mirrors 58 and 60 at a steady speed based on the signals sent from the reference signal generation circuits 62 and 64 and the detectors 70 and 72. Then, the laser beam generated by the laser beam generators 54 and 56 are detected by the detectors 70 and 72. The detection signals sent from detectors 70 and 72 are used as trigger signals of not-shown exposure information devices. The laser beam generators 54 and 56 generate laser beam based on the information sent from the exposure information devices. Subsequently, the rotating polygon mirrors 58 and 60 polarize the laser beams to scan the photosensitive element.

Figure 5A:
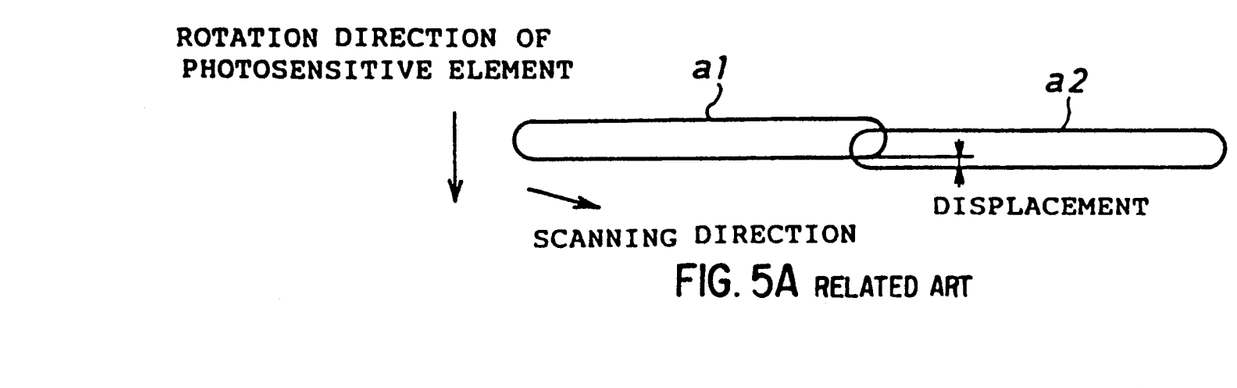
FIGS. 5a and 5b illustrate displacement between scanning lines caused by the related-art divisional exposure apparatus.
Figure 5B:
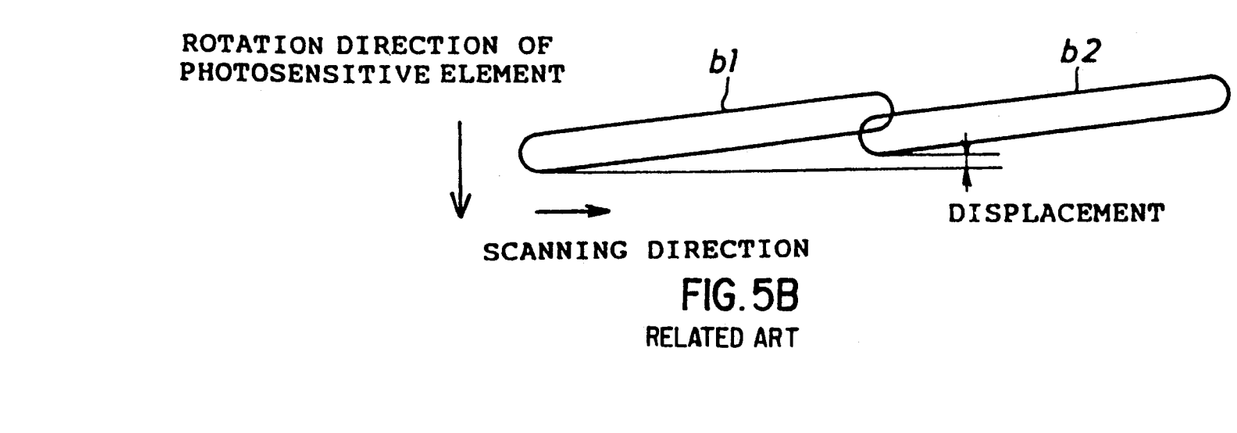

However, in the above conventional exposure apparatus, the scanning lines of the exposure device 50 and 52 sometimes do not connect smoothly, causing displacement therebetween as shown in FIGS. 5A-B. This is because the rotating polygon mirrors 58 and 60 are simply driven to rotate at a steady speed by the respective drive circuits 66 and 68. While the laser beams scan the photosensitive element in a direction parallel to the axis of the drum-shaped photosensitive element (referred to as the primary scanning direction hereinafter), the photosensitive element travels in a direction perpendicular to the scanning direction (referred to as the secondary scanning direction hereinafter), exposing the scanning region on the photosensitive element. Therefore, occasionally the scanning line of the exposure device 50 does not connect smoothly with that of the exposure device 52, causing displacement therebetween. For instance, as shown in FIG. 5A, if the scanning directions of the exposure devices 50 and 52 are slanting in accordance with the traveling speed of the photosensitive element, scanning lines a1 and a2 perpendicularly cross the traveling direction of the photosensitive element at a right angle. In this case, if the exposure timing of the exposure devices 50 and 52 does not match for some reason, for example, if the rotation speed of the rotating polygon mirror 60 of the exposure device 52 is slowed down by the malfunction of the drive circuit 68, the scanning lines a1 and a2 of the exposure devices 50 and 52 do not connect smoothly, distorting the image.

If, on the other hand, the primary scanning directions of exposure devices 50 and 52 are arranged perpendicularly to cross the traveling direction (secondary scanning direction) of the photosensitive element, the scanning lines b1 and b2 are made slanting at the secondary scanning direction. In the event that the exposure timing of the exposure devices 50 and 52 does not match for some reason, for example, if the rotation speed of the rotating polygon mirror 60 of the exposure device 52 is slowed down by the malfunction of the drive circuit 68, the scanning lines a1 and a2 of the exposure devices 50 and 52 do not connect smoothly, distorting the image.

Figure 14A:
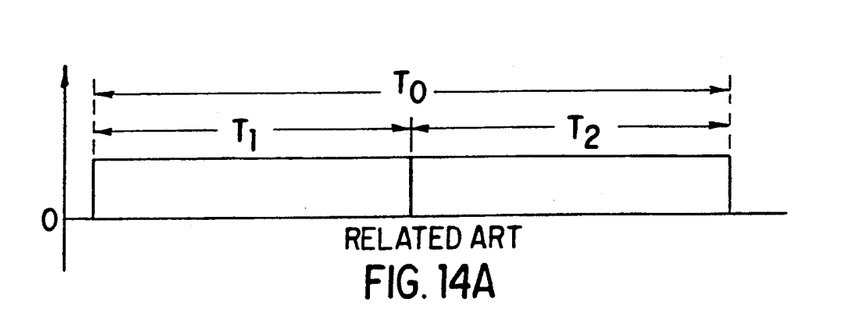
FIGS. 14A-C are graphs showing the relation between exposure regions and exposure corresponding thereto of the divisional exposure apparatus of the related-art divisional exposure apparatus.
Figure 14B:
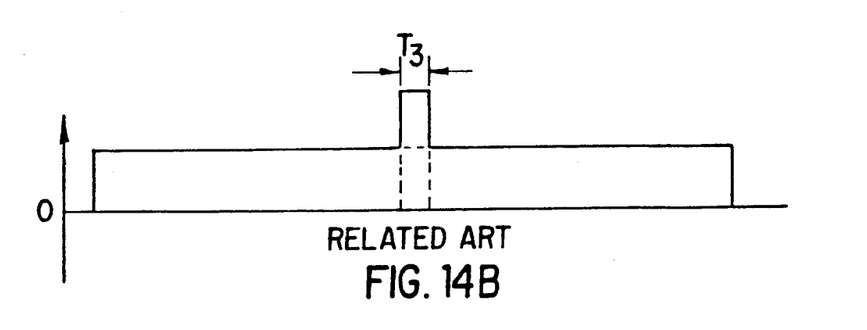
Figure 14C:
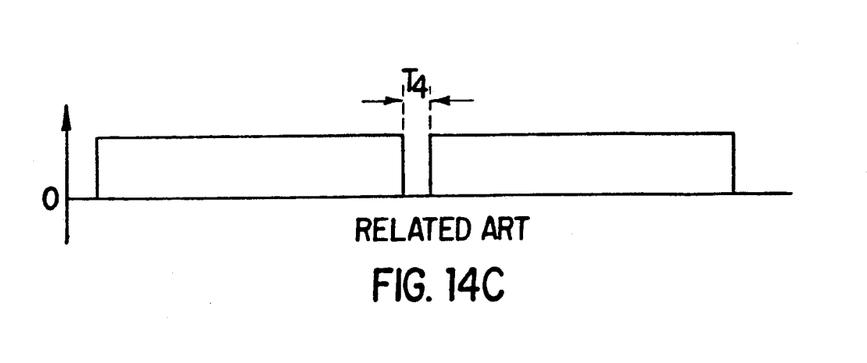

Another problem of the conventional divisional exposure apparatus is that the degree of exposure sometimes changes too much where the exposure beams connect. More particularly, if the two exposure beams neatly abut on each other without displacement in the middle of a large exposure region, the large exposure region is uniformly exposed as shown in FIG. 14A. As shown in FIG. 14B, however, if the two exposure beams overlap each other, the overlapping region T3 is exposed at a degree twice as high as the other regions. On the other hand, as shown in FIG. 14C, if there is a gap between the two beams on the photosensitive element, the gap becomes a non-exposure region T4 in the middle of the large exposed region T0.

The overlapping exposure (double exposure) or the non-exposure may cause misinterpretation of the information and hinder printing of a high-quality image. Despite attempts made to adjust the seam of the two beams, it has been difficult to completely overcome the problem, thus preventing double exposure caused by overlapping or non-exposure.

SUMMARY OF THE INVENTION

An object of the present invention made to overcome the above-identified problems is to provide a divisional exposure apparatus that does not distort an image by dividing a scanning region.

Another object of the present invention is to provide a divisional exposure apparatus that provides a high-quality image even on the border of divided exposure regions.

A further object of the present invention to provide a divisional exposure apparatus that does not cause double exposure or non-exposure without fine adjustment of the seam of two exposure beams.

The divisional exposure apparatus of a first embodiment of the present invention is provided with a plurality of exposure devices for dividing the scanning region on a photosensitive element and exposing the divided scanning regions based on externally provided information, in which a first exposure device of the plurality of the exposure devices comprises a first laser beam generator for generating a laser beam, first drive means for rotatably driving a reflection mirror which polarizes the laser beam generated by the first laser beam generator to scan along a scanning line, a first detection means for detecting the laser beam which is polarized by the drive means, when a laser beam irradiates a scanning line outside the corresponding divided scanning region and each of the other exposure devices comprises a laser beam generator, drive means for rotatably driving a reflection mirror at a variable speed which polarizes the laser beam generated by the laser beam generator to scan along a scanning line, a detection means for detecting the laser beam which is polarized by the drive means irradiating a scanning line outside the corresponding divided scanning region, a phase control means for changing the scanning speed by controlling the drive means so that the output signals of the exposure device and the first exposure device have the same phase.

In operation, the first drive means of the first exposure device rotatably drives the reflection mirror and the first laser beam generator generates a laser beam. Then, after the laser beam is polarized by the reflection mirror, the first detection means detects the laser beam when the laser beam irradiates a scanning line outside the corresponding divided scanning region.

At the same time, each of the other exposure devices also rotatably drives the reflection mirror, and the first laser beam generator generates a laser beam. Then, after the laser beam is polarized by the reflection mirror, the first detection means detects the laser beam, when the laser beam irradiates a scanning line outside the corresponding divided scanning region. Finally, the phase control means controls the drive means so that the output signals of the detection means have the same phase. Thus, division of the scanning region by a plurality of exposure devices does not cause a distorted image.

A divisional exposure apparatus of a second embodiment of the present invention, in which the exposure region of a photosensitive element is divided into plurality of adjacent exposure regions in the primary scanning direction and a plurality of exposure devices corresponding to the divided exposure regions are provided for scan-exposing the divided exposure regions in the primary scanning direction while transferring the photosensitive element in the secondary scanning direction, which crosses the primary scanning direction at a right angle, comprises a slanting means for slanting the scanning direction of the exposure devices from the primary scanning direction toward the secondary scanning direction, in which the tangent of the slanting angle of the scanning direction is the value obtained by dividing the distance traveled by the photosensitive element in the secondary scanning direction during the time period in which the exposure devices complete one scanning operation by the scanning distance of each exposure device.

In operation, the divisional exposure apparatus of the present embodiment slants the scanning direction of each exposure device provided for the corresponding divided exposure region from the primary scanning direction toward the secondary scanning direction by the slanting means. The scanning lines of the exposure devices on the photosensitive element run straight and parallel to the primary scanning direction because the tangent of the slanting angle of the exposure devices is the value obtained by dividing the distance traveled by the photosensitive element in the secondary scanning direction during the time period in which the exposure devices complete one scanning operation by the scanning distance of each exposure device.

A divisional exposure apparatus of a third embodiment of the present invention comprises a plurality of exposure beam generation means for generating a plurality of exposure beams corresponding to a plurality of divided exposure regions on a photosensitive element; double scanning means for making a double exposure region in the changeover area of two adjacent exposure beams generated by the exposure beam generation means; and exposure beam control means for switch-control the exposure beams by increasing the exposing energy of one of the two adjacent exposure beams and decreasing the exposing energy of the other exposure beam so that the increasing rate of the exposing energy of the exposure beam equals the decreasing rate of the exposing energy of the other exposure beam.

In operation, the double exposure region is intentionally double-exposed. However, one of the two exposure beams increases while the other decrease. Thus, the added exposure of the two exposure beams in the double exposure area are substantially the same as the exposure of the other ordinary exposure regions. Even if the scanning of the two exposure beams remains somewhat displaced, the added exposure on the double exposure area is still close to the exposure elsewhere in other regions, which makes it unnecessary to fine-adjust the changeover of the two exposure beams.

DETAILED DESCRIPTION OF THE PREFERRED EMBODIMENTS

FIRST EMBODIMENT

A first embodiment of the present invention is described in detail hereinafter.

Figure 1:
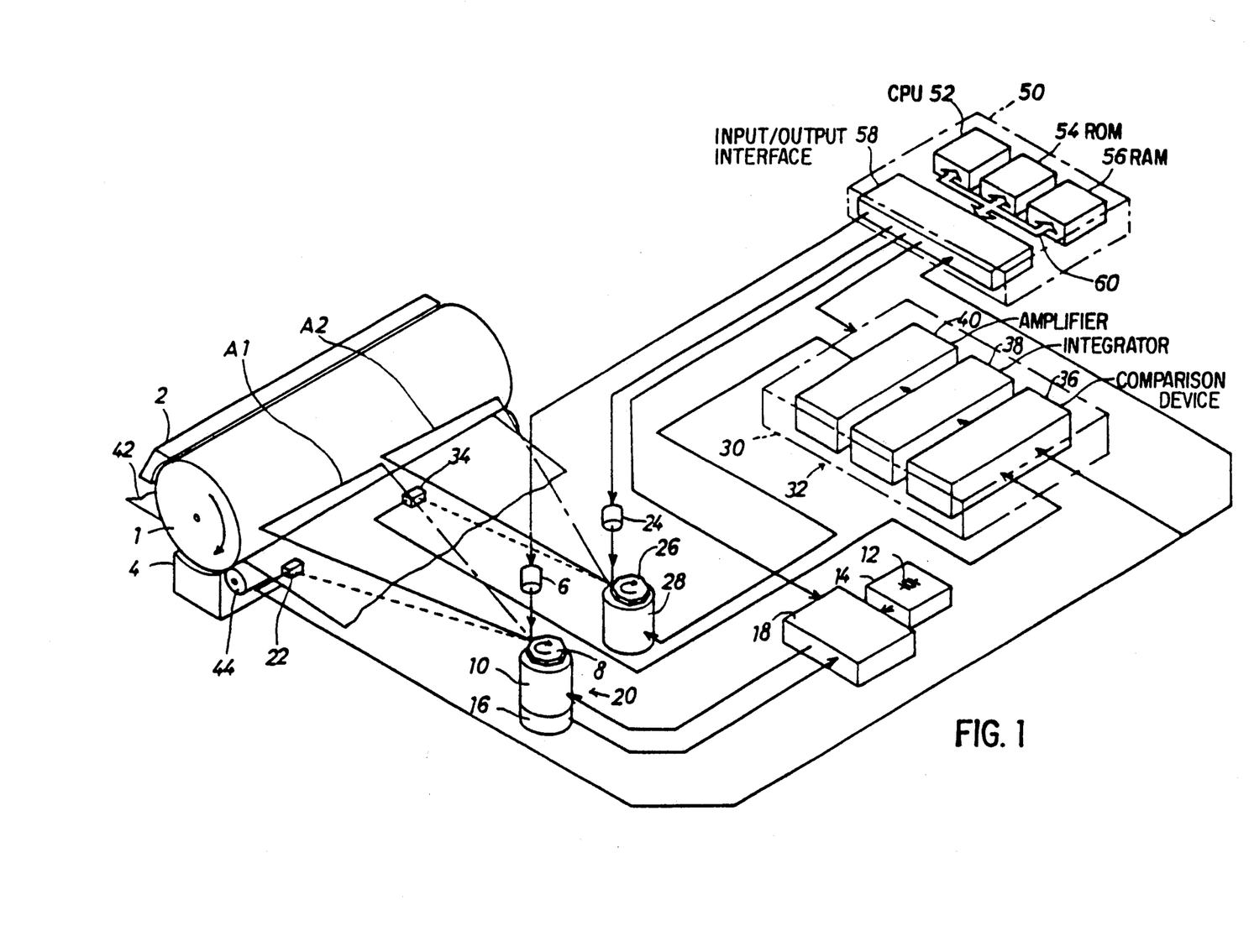
FIG. 1 is a perspective schematic representation of a divisional exposure apparatus of a first embodiment of the present invention.

Referring to FIG. 1 illustrating a schematic view of the divisional exposure apparatus of the first embodiment, a drum-shaped photosensitive element (referred to as photosensitive drum hereinafter) 1 is rotatably driven at a steady speed in the direction indicated by an arrow x. Arranged around the periphery of the photosensitive drum 1 are a charger 2, a transfer printer 4, a not-shown cleaner, and so forth. A latent optical image drawn on the photosensitive drum 1 by a laser beam is developed while the photosensitive drum makes one rotation. In this embodiment, as shown in FIG. 1, two laser beams, which divide the photosensitive drum 1 into two exposure regions in the secondary scanning direction, draw the latent image.

A first semiconductor laser generation element 6 irradiates a laser beam at a hexagon or octagon rotatable reflecting mirror 8 which is rotatably driven by a DC motor 10. The DC motor is controlled to rotate at a steady speed by a drive control circuit 18, which compares a signal from a reference signal generation circuit 14 having a crystal oscillator 12 with a signal from an encoder 16 that detects the rotation of the DC motor 10 and synchronizes the two signals, thereby driving the DC motor at a steady speed. The DC motor 10, the reference signal generation circuit 14, the encoder 16, and the drive control circuit 18 compose a first drive unit 20 as a drive means.

The laser beam generated by the first semiconductor laser generation element 6 is polarized by the rotatable reflecting mirror 8 so that the laser beam irradiates the left half scanning region (referred to as the first scanning region hereinafter) on the photosensitive drum 1. The exposure beam scanning the photosensitive drum 1 draws a slanted line with the left side up to compensate for the rotating speed of the photosensitive drum 1 so that the actual scanning line A1 is parallel to the rotating axis of the photosensitive drum 1. A first detection unit 22 is also provided to detect the laser beam, which is polarized by the rotatable reflecting mirror 8, when the laser beam irradiates outside the first scanning region along the scanning line Al on the photosensitive drum 1. An optical sensor which generates a signal upon receiving a laser beam suffices for the first detection unit 22. The first detection unit 22 is provided outside the first scanning region along the first scanning line in order not to obstruct the irradiation of the laser beam at the first scanning region on the photosensitive drum 1 during the scanning operation. The first semiconductor laser generation element 6, the rotatable reflecting mirror 8, the first drive unit 20, and the first detection unit 22 compose the first exposure device.

Another semiconductor laser generation element 24 is provided to carry out irradiation of the remaining right half of the scanning region (referred to as the second scanning region hereinafter) by generating another laser beam. The second semiconductor laser generation element 24 generates a laser beam at a hexagon or octagon rotatable reflecting mirror 26, which is rotatably driven by a DC motor 28. The rotation of the DC motor 28 is controlled by a drive control circuit 30. The DC motor 28 generation circuit 14, the encoder 16, and the drive control circuit 30 compose a second drive unit 32 as a drive means.

The laser beam generated by the second semiconductor laser generation element 24 is polarized by the rotatable reflecting mirror 26 so that the laser beam irradiates the second scanning region on the photosensitive drum 1.

The exposure beam scanning on the photosensitive drum 1 draws a slanted line with the left side up to compensate for the rotating speed of the photosensitive drum 1 so that the actual scanning line B2 is parallel to the rotating axis of the photosensitive drum 1 and the scanning lines A1 and B2 connect smoothly to form a straight line. A second detection unit 34 is also provided to detect the laser beam, which is polarized by the rotatable reflecting mirror 26, when the laser beam irradiates outside the second scanning region along the scanning line A1 on the photosensitive drum 1. An optical sensor which generates a signal upon receiving a laser beam suffices for the second detection unit 34. The second detection unit 34 is provided outside the first and second scanning regions in order not to obstruct the irradiation of the laser beam in either scanning region on the photosensitive drum 1 during the scanning operation. The signals generated by the two detection units 22 and 34 are sent to the drive control unit 30. The drive control unit 30 then relays the signals to a phase comparison unit 36. If the phase of the signal from the detection unit 22 is ahead of that from the detection unit 34, the phase comparison unit 36 generates a compensation signal of +5 V representing the phase difference. If, on the other hand, the phase of the signal from the detection unit 22 is behind that from the detection unit 34, the phase comparison unit 36 generates a compensation signal of −5 V representing the phase difference. The compensation signal representing the phase difference is sent to an integrator 38 to be integrated. Then, the signal is sent to an amplifier 40. The drive signal to be sent to the DC motor 28 is increased or decreased based on the integrated compensation signal by the amplifier 40 to change the rotating rate of the DC motor 28 such that the signals from the detection unit 22 and the detection unit 34 synchronize with each other.

The phase comparison unit 36, the integrator 38, and the amplifier 40 of the drive control unit 30 compose a synchronization control means. The semiconductor laser generation element 24, the rotatable reflecting mirror 26, the drive control unit 32, the second detection unit 34 compose a the second exposure device.

Meanwhile, the photosensitive drum 1 is exposed by the laser beam and not-shown toner adheres to the exposed part of the photosensitive drum 1. Then, recording paper 42 dispensed by a paper dispensing roller 44 is adhered to the photosensitive drum 1 before the exposed part of the photosensitive drum 1 is rotated to reach the transfer printer 4 as indicated by the arrow x. Consequently, the toner image on the photosensitive drum 1 is transfer-printed on the recording paper 42, recording the image on the recording paper 42.

The aforementioned operations are centrally controlled by a computer 50, which comprises a ROM 54 provided with control programs and data, a RAM 56, an input/output interface 58, and a bus 60 for connecting thereof.

The CPU 52 carries out the following process by temporarily reading and writing necessary data in the RAM 56 in accordance with the programs stored in the ROM 54.

Upon receiving image information to be printed on record paper 42 from a not-shown peripheral, the CPU 52 sends a rotation start signal to the first and the second drive units 18 and 30. Upon receiving a signal from the detection unit 22, the CPU 52 sends laser modulation signals for each scanning line to the laser beam generation elements 6 and 24. The laser modulation signals sent to the laser beam generation elements 6 and 24 form the left and the right halves of the image, respectively.

In the operation of the first-embodiment divisional exposure apparatus, when image information is sent from the periphery after the power is switched on, the drive control units 18 and 30 generates rotation drive signals to the DC motors 10 and 18, rotatably driving the DC motors 10 and 28 and, therefore, the rotatable reflecting mirrors 8 and 26. Meanwhile, the laser beams generated by the laser beam generation elements 6 and 24 are polarized by the rotatable reflecting mirrors 8 and 26 to irradiate along the scanning lines.

Upon detecting the laser beams generated by the laser beam generation elements 6 and 24, the detection units 22 and 34 sends the detection signals to the phase comparison unit 36 of the drive control unit 30.

The detection signal from the detection unit 22 is also sent to the CPU 50. Then, the CPU 50 sends a laser modulation signal corresponding to a scanning line and part of the image information to the laser beam generation elements 6 and 24. The first laser beam generation element 6 receives the laser modulation signal corresponding to the left half of the image information while the second laser beam generation element 24 receives the laser modulation signal corresponding to the right half of the image information. Based on the two received laser modulation signals, the laser beam generation elements 6 and 24 generate laser beams, which are polarized by the rotatable reflecting mirrors 8 and 26 and expose the photosensitive drum 1 by irradiation. This exposure operation is repeated for each pair of scanning lines until a latent image corresponding to the image information is formed on the photosensitive drum 1.

Figure 2A:
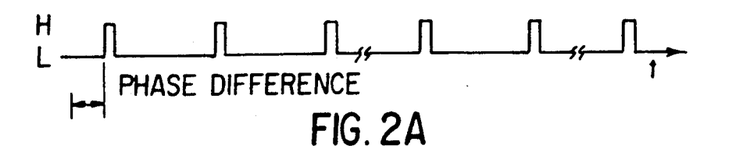
FIGS. 2A-E are time charts of signals on various stages.
Figure 2B:
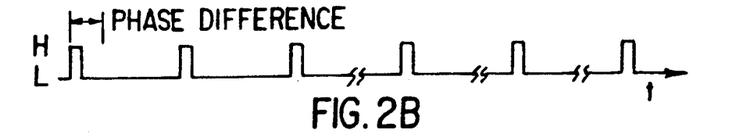
Figure 2C:
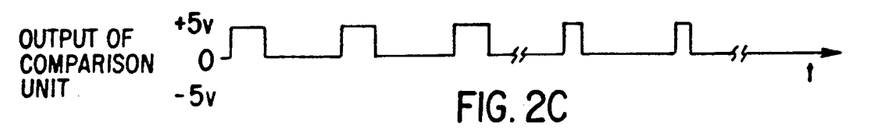

At the same time, the detection units 22 and 34 detect the laser beam irradiating for each scanning line. Then, as shown in FIGS. 2A and 2B as an example, the detection signals from the detection units 22 and 34, respectively, are sent to the phase comparison unit 36 of the drive control unit 30. The phase comparison unit 36 compares the detection signals and, if the signal from the detection unit 34 is behind that from the detection unit 22, generates a +5 V compensation signal representing the phase difference as shown in FIG. 2C. If, on the contrary, the signal from the detection unit 34 is ahead of that from the detection unit 22, a −5 V compensation signal representing the phase difference is generated.

Figure 2D:
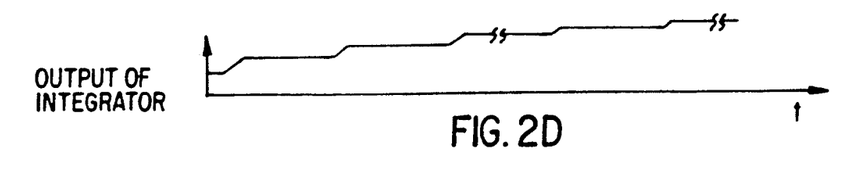
Figure 2E:
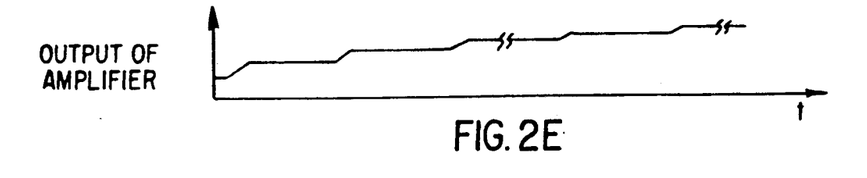

As shown in FIG. 2D, the integrator 38 integrates the signal compensated for the phase difference (referred to as compensation signal hereinafter) and sends the integrated signal to the amplifier 40. Therefore, if the compensation signal is positive, the output signal level of the integrator 38 rises while the output signal level of the integrator 38 falls if the compensation signal is negative one. The amplifier 40 sends a drive signal to the DC motor based on the integrated signal, causing the DC motor 28 to rotate at a speed corresponding to the drive signal.

Figure 3A:
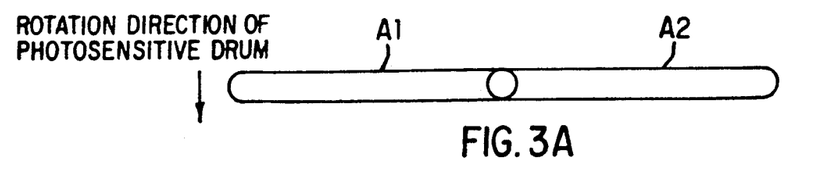
FIGS. 3A and 3B illustrates scanning lines of the first embodiment.

As shown in FIGS. 2A and 2B, if there is a phase difference between the signals from the detection units 22 and 34, a compensation signal is generated corresponding to the phase difference. Then, the compensation signal is integrated, changing the level of the signal upward or downward in accordance with the phase difference. Next, the integrated signal is amplified by the amplifier 40. If the phase of the signal sent from the detection unit 34 is behind that of detection unit 22, the signal level generated to the DC motor 28 is raised to increase the rotation speed thereof. If the phase is ahead that of detection unit 22, the signal level generated to the DC motor 28 is reduced, decreasing the rotation speed thereof. In this way, the rotation speed of the DC motor 28 is adjusted to cancel the phase difference. Therefore, the rotation reflecting mirrors 8 and 26 are rotated at the same rotation speed. Then, the laser beams are detected by the detection units 22 and 34 at the same timing and the rotation speed of the rotatable reflecting mirrors 8 and 26 becomes the same. Accordingly, scanning along the scanning lines A1 and A2 starts at the same timing. Therefore, as shown in FIG. 3A, no displacement occurs between the scanning lines A1 and A2 in the secondary scanning direction. The scanning lines A1 and A2 connect smoothly and make a straight line, not causing distortion in the image.

Figure 3B:
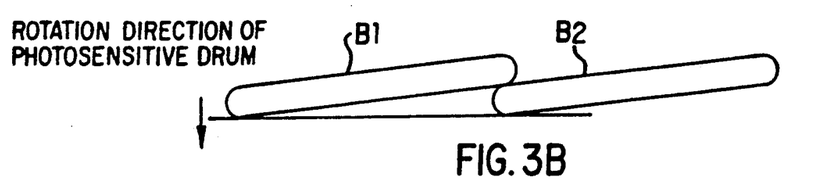

In the present invention, the scanning lines A1 and A2 form a straight line. However, if laser beams scan on the photosensitive drum 1 in parallel with the rotation axis of the photosensitive drum 1, scanning lines B1 and B2 slant with respect to the rotation axis. Since the scanning lines B1 and B2 also run parallel to each other in this case, and exposure along the scanning lines B1 and B2 starts at the same timing, there is neither displacement nor distortion in the image.

SECOND EMBODIMENT

Referring now to FIGS. 6–10, a second embodiment of the present invention is explained hereinafter.

Figure 6:
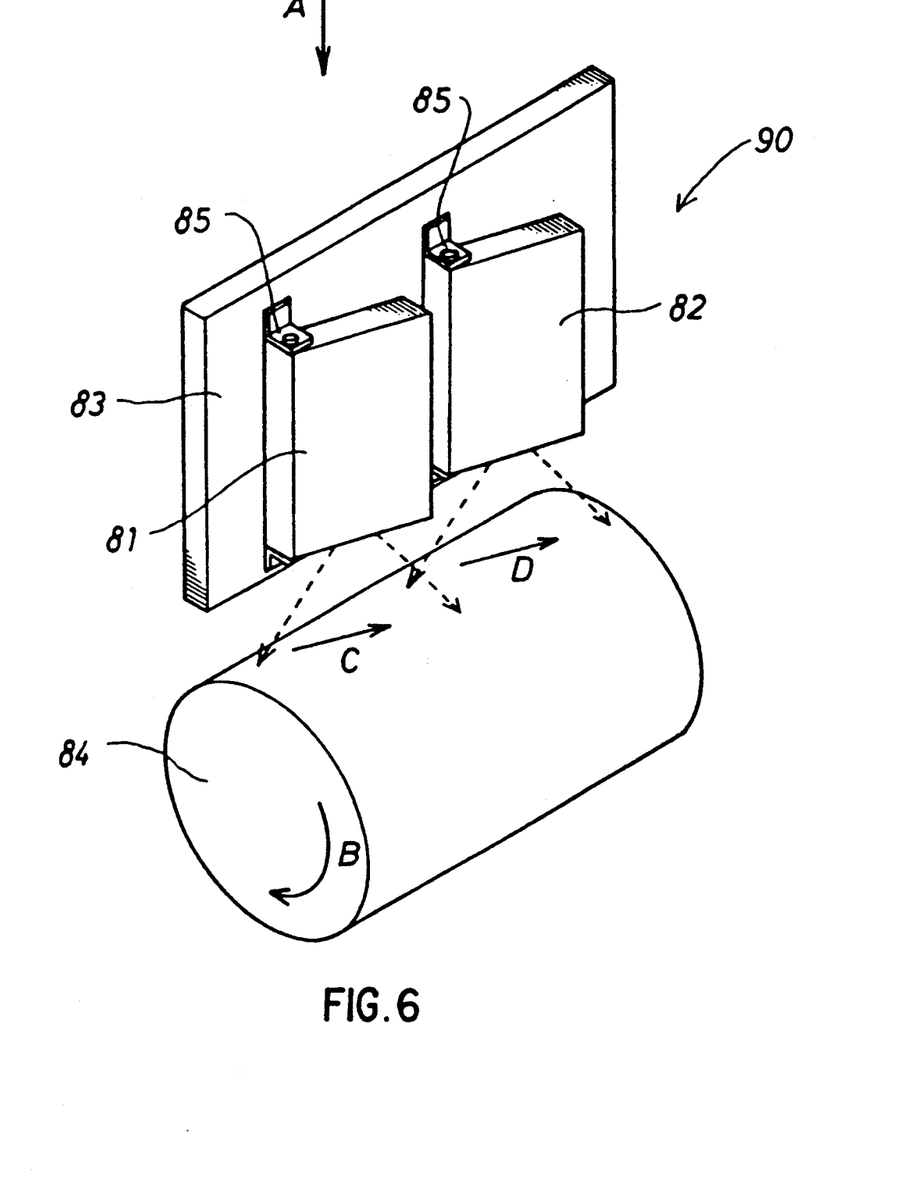
FIG. 6 is a perspective schematic view of a divisional exposure apparatus of a second embodiment of the present invention.
Figure 7:
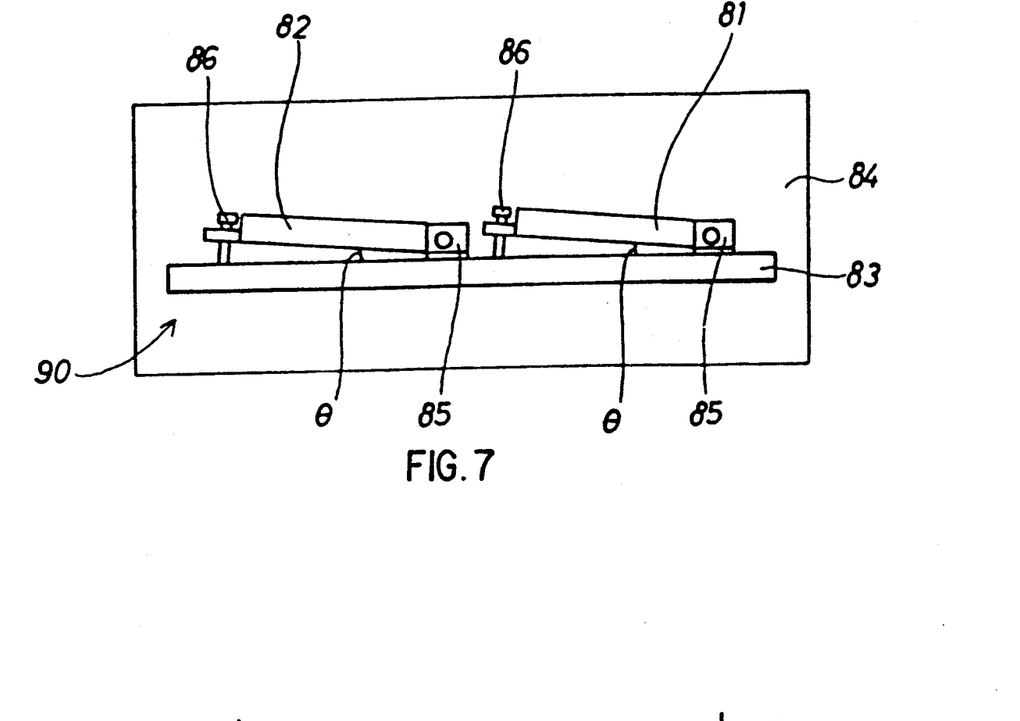
FIG. 7 is the second-embodiment divisional exposure apparatus of FIG. 6 seen from the direction indicated by an arrow A.

A divisional exposure apparatus 90 comprises a first exposure device 81, a second exposure device 82, and a fixing plate 83 for fixing the two exposure devices 81 and 82 thereon. The divisional exposure apparatus 90 is provided at a predetermined distance from a photosensitive drum 84, which rotates in the direction indicated by an arrow B. The fixing plate 83 is arranged in parallel to the rotation axis of the photosensitive drum 84. As shown in FIG. 7, the first and second exposure devices 81 and 82 are rotatably fixed on one ends by support members 85, while the other ends of the exposure devices 81 and 82 are supported at a predetermined distance from the fixing plate 83 by adjustable screws 86, thereby inclining the first and second exposure devices 81 and 82 at a predetermined angle $\theta$ to the fixing plate 83. The angle $\theta$ is adjustable by the adjustable screws 86.

Figure 8:
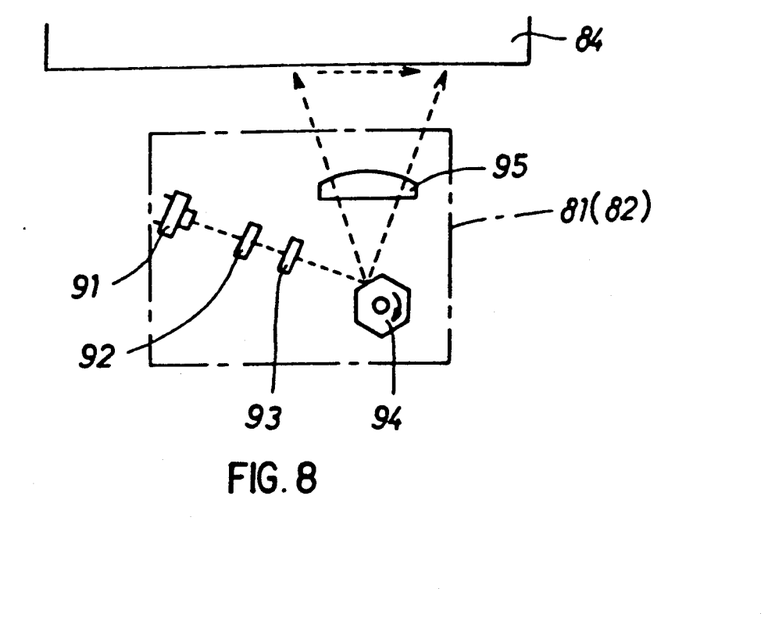
FIG. 8 illustrates the method of exposure of the divisional exposure apparatus of the second embodiment.

As shown in FIG. 8, the first exposure device 81 (the second exposure device 82 is identical in construction to first exposure device 81 and thus not shown in FIG. 8.) comprises a semiconductor laser 91 serving as a light source for generating a laser beam, a collimator lens 92, a cylindrical lens 93 for converting the laser beam generated by the semiconductor laser 91 into an exposure beam for exposure, a rotating polygon mirror 94 for reflecting the exposure beam to scan in the direction parallel to the rotation axis of the photosensitive drum 84, and a f-θ image formation lens 95 for converting isometric velocity irradiation to constant velocity scanning on the photosensitive drum 84. The constant velocity scanning by the first and the second exposure devices 81 and 82 is controlled by a not-shown computer.

Figure 9:
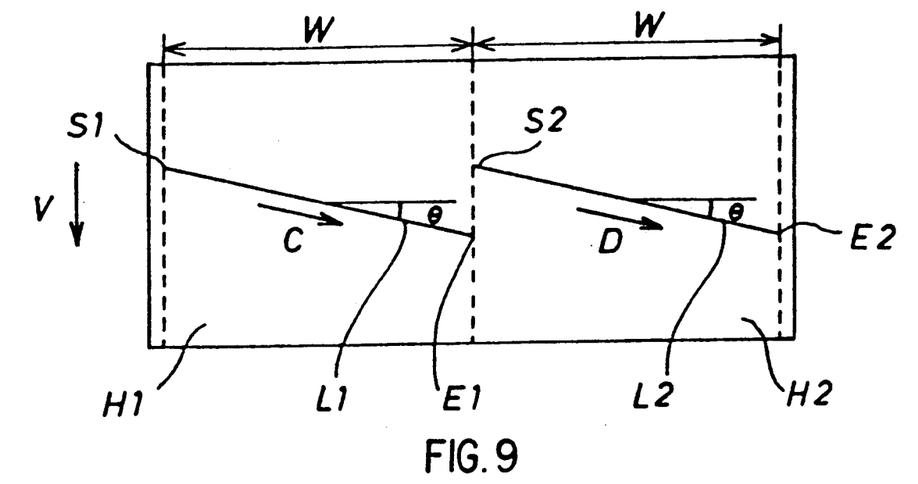
FIG. 9 is a illustration of the scanning direction of the divisional exposure of the second embodiment.

Referring now to FIG. 9, the scanning directions of the first and second exposure devices 81 and 82 are explained hereinafter.

Figure 13:
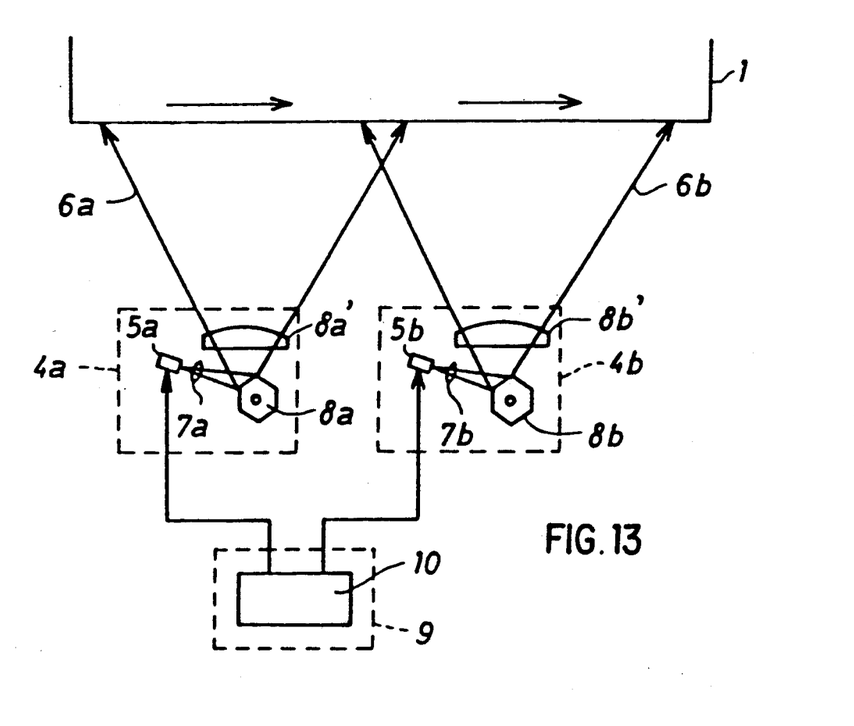
FIG. 13 is a block diagram of a divisional exposure apparatus of a fourth embodiment of the present invention.

FIG. 13 is a plan view of the photosensitive drum 84 seen from the direction indicated by an arrow A in FIG. 6.

The exposure region of the photosensitive drum 84 is divided into two regions H1 and H2 adjacent to each other in the primary scanning direction. The first and second exposure devices 81 and 84 corresponding to the divided regions H1 and H2, respectively, carry out scan-exposure simultaneously. The exposure devices 81 and 82 are inclined by adjustment of the adjustable screws 86 at the angle θ to the primary scanning direction. The angle θ can be adjusted by the adjustable screws 86. Likewise, the scanning directions of the exposure beams irradiated by the exposure devices 81 and 82 are inclined at the angle θ to the primary scanning direction, making the loci L1 and L2 of the exposure beams also inclined at the angle θ to the primary scanning direction. The direction indicated by arrows C and D are the actual scanning directions.

The determination of the angle θ is explained with specific reference to FIG. 9.

The angle θ is expressed in the following equation:

$$\theta = \arctan(vt/w)$$

In this equation, v is the traveling speed of the outside surface of the photosensitive drum 84; t is the time required for each of the exposure devices 81 and 82 to carry out one scanning operation; and w is the width of each of the divided exposure regions H1 and H2 in the primary scanning direction.

Figure 10:
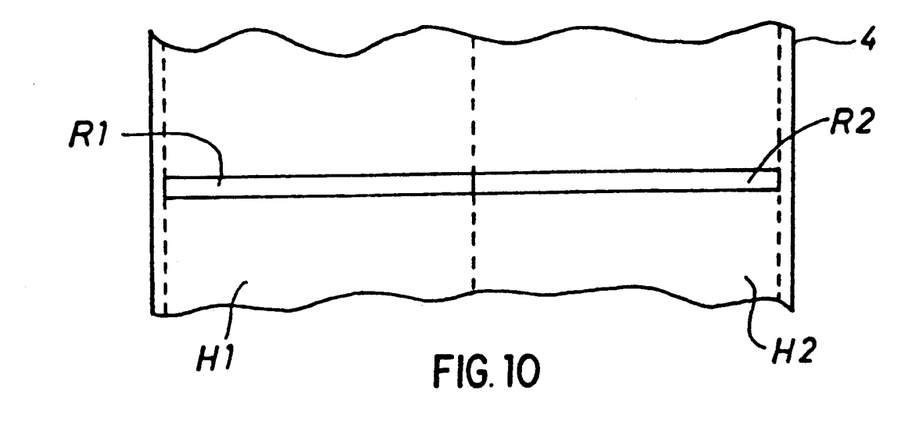
FIG. 10 is a illustration of the scanning track of the divisional exposure apparatus of the second embodiment.

While the exposure devices 81 and 82 are scan-exposing, the photosensitive drum 84 rotates to move the exposure region by a distance vt. The angle θ is determined by the above equation such that the terminal points E1 and E2 of the laser beam loci R1 and R2 are displaced in the secondary scanning direction by the distance vt during the scanning operation. Therefore, as shown in FIG. 10, the loci R1 and R2 of the irradiated laser beams form a straight line running parallel to the primary scanning direction.

The above divisional exposure apparatus of the second embodiment does not cause displacement in the area where the two divided exposure regions abut on each other, thus providing as high quality an image as a non-divisional exposure apparatus that does not divide the exposure region. This advantage is achieved by the first and second exposure devices 81 and 82 inclined at a predetermined angle to the primary scanning direction.

Furthermore, because the angle θ can be adjusted by the adjustable screws 86, the present-embodiment divisional exposure apparatus can cope with a change in the rotation speed of the photosensitive drum 84 or in the scanning speed of the first and second exposure devices 81 and 82.

While the described second embodiment represent a preferred form of the invention, it is to be understand that changes and variations can be made without departing from the scope and the spirit of the present invention.

For instance, the exposure region can be divided into more than two narrower exposure regions for exposure. A flat, rectangular photosensitive element may be used instead of the drum-shaped one.

THIRD EMBODIMENT

Referring now to FIGS. 1–14C, a third embodiment of the present invention is explained hereinafter.

Figure 11:
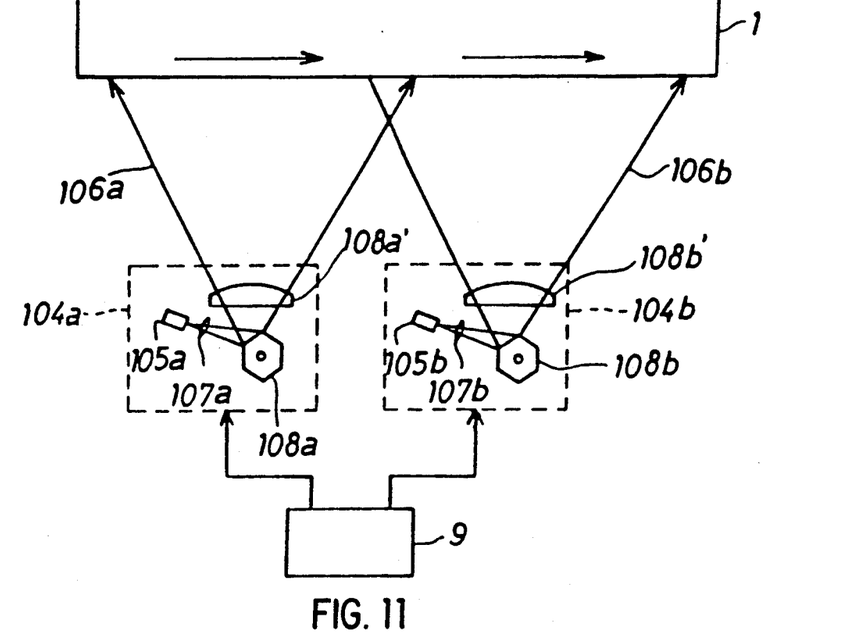
FIG. 11 is a block diagram of a divisional exposure apparatus of a third embodiment of the present invention.

Illustrated in FIG. 11 is a divisional exposure apparatus that divides a predetermined exposure area T0 of the photosensitive element 101 into two using first and second exposure devices 104a and 104b. The first exposure device 104a comprises a semiconductor laser 105a as a light source, an optical exposure beam generation means 107a for generating an exposure beam 106a based on the laser beam irradiated by the semiconductor laser 105a, a scanning means (a polygon-mirror polarizer) 108a for scanning the exposure region T0 of the photosensitive element 101 by the exposure beam 106a, and an f-θ lens 108a'. Likewise, the second exposure device 104b comprises a semiconductor laser 105b as a light source, an optical exposure beam generation means 107b for generating an exposure beam 106b, a scanning means (a polygon-mirror polarizer) 108b, and an f-θ lens 108b'. The first and second exposure devices 104a and 104b are controlled by an exposure control means 109.

Figure 12A:
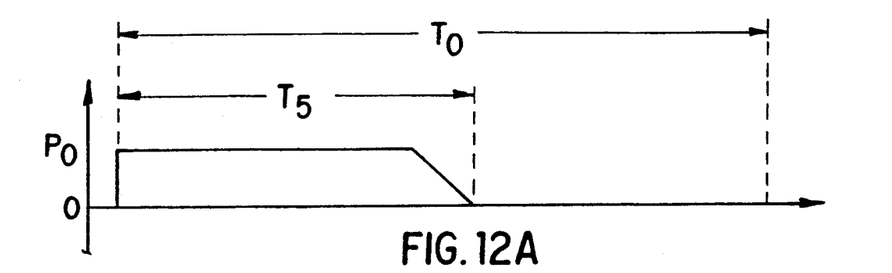
FIGS. 12A-12E are graphs showing the relation between exposure regions and exposure corresponding thereto of the divisional exposure apparatus of the third embodiment.
Figure 12B:
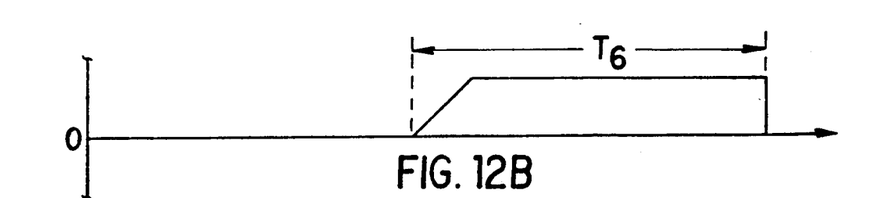
Figure 12C:
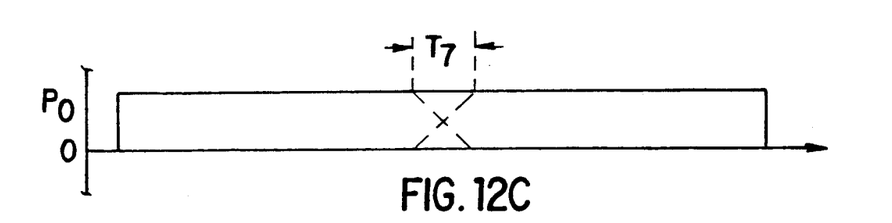

As shown in the graphs of FIGS. 12A–C, in the present embodiment, an exposure region T5, which is slightly wider than half of the exposure region T0, is exposed by the exposure beam 106a of the first exposure device 104a, while an exposure region T6, which is slightly wider than the remaining half of the exposure region T0, is exposed by the exposure beam 106b of the second exposure device 104b. In this way, the end of the exposure region T5 overlaps the beginning of the exposure region T6. Then, the exposure energy of the exposure beams 106a and 106b are either increased or decreased, respectively, at the same rate.

More particularly, the width of the overlapping region T7 is adjusted by the scanning means 108a and 108b. The exposure beam 106a of the first exposure device 104a is modulated by the control means 109 so that the intensity of the exposure beam 106a proportionally decreases from a predetermined value Po down to zero in the overlapping region T7. Conversely, the exposure beam 106b of the second exposure device 104b is modulated by the control means 109 so that the intensity of the exposure beam 106b proportionally increases from zero to the predetermined value Po in the overlapping region T7.

If the exposure beams 106a and 106b of the first and second exposure devices 104a and 104b, respectively, are adjusted to scan appropriately, the intensity of the exposure beam 106a starts to decrease and the output of the exposure beams 106b starts to increase at the same point, effecting an shown in FIG. 16C. Therefore, the exposure region T0 is uniformly exposed at the predetermined constant exposure value Po because the exposure region T7 is also exposed at the predetermined value Po, which equals the addition of the decreasing intensity of the exposure beam 106a decreasing at a predetermined rate and the increasing intensity of the exposure beam 106b increasing at the same predetermined rate.

Figure 12D:
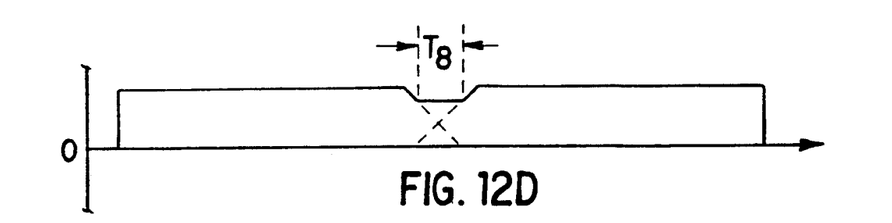

FIG. 12D shows that the two exposure regions 106a and 106b are slightly displaced from the optimum positions apart from each other, narrowing the overlapping exposure region T7. Although the exposure slightly decreases, there is no possibility of no exposure.

Figure 12E:
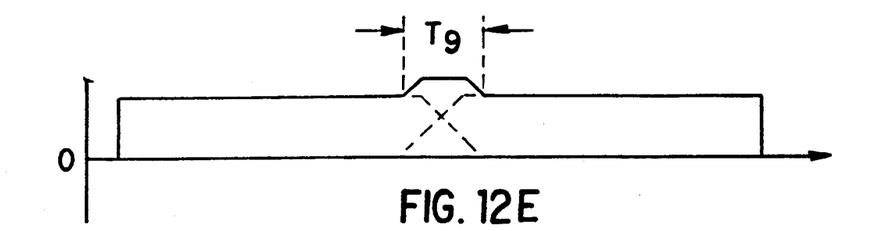

On the other hand, FIG. 16E shows that the two exposure regions 106a and 106b are slightly displaced from the optimum positions toward the middle of the exposure region, widening the overlapping exposure region T7. Accordingly, the exposure slightly increases, but double exposure does not occur.

While the described embodiment represents the preferred form of the invention, it should be understood that changes and variations can be made without departing from the scope and the spirit of the invention.

For example, although the two exposure beams 106a and 106b are generated by the two semiconductor lasers 105a and 105b, respectively, in the present embodiment, one laser beam generated by one semiconductor laser can be divided into two beams by a half mirror. Furthermore, the exposure beams in the overlapping region may be adjusted by high speed pulse-width modulation. Shown in FIG. 13 is a divisional exposure apparatus similar to the one shown in FIG. 11. This similar divisional exposure apparatus is provided with a modulation means 110 in the exposure control mean 109 for modulating the intensity of the laser beams of the two semiconductor lasers 105a and 105b based on an externally provided information about the intensity of a laser beam. The modulation means 10 modulates the exposure beams 106a and 106b. In this similar divisional apparatus, the principle of division and exposure is the same as that of the third embodiment.

In accordance with the divisional exposure apparatus of the present invention, dividing the scanning region on a photosensitive element into narrower regions does not cause displacement between scanning lines scanned by a plurality of exposure devices, thus smoothly connecting the scanning lines with each other. Consequently, a high quality, distortion-free image is provided.

The above advantage is made possible by controlling the output signals of the detection means in such a way that the output signals have the same phase. The above advantage is also realized by slanting the scanning direction of the exposure devices from the primary scanning direction toward the secondary scanning direction, in which the tangent of the slanting angle of the exposure devices is the value obtained by dividing the distance traveled by the photosensitive element in the secondary scanning direction during the time period in which the exposure devices complete one scanning operation by the scanning distance of each exposure device.

Also in the present invention, when a wide exposure region is divided and exposed by a plurality of exposure devices, the changeover (overlapping) region where two adjacent exposure beams connect with each other are exposed by the two adjacent exposure beams and one of the two exposure beams is increased while the other is decreased to average the addition of the two exposure beams. Therefore, double exposure or non-exposure does not occur in the changeover region. A wide exposure region can be, thus, accurately exposed without fine-adjusting the changeover of the exposure beams.

Furthermore, the optical intensity of the light source is modulated based on externally provided information about optical intensity to modulate the intensity of the exposure beams on the exposure region.

What is claimed is:

1. A divisional exposure apparatus, comprising:
   a photosensitive element;
   primary exposure means for scanning a primary portion of a scanning region on the photosensitive element with a primary laser beam at a primary scanning rate based on an externally provided signal;
   secondary exposure means for scanning a secondary portion of the scanning region with a secondary laser beam at a secondary scanning rate based on an externally provided signal;
   primary detection means located outside the first portion of the scanning region for detecting the first laser beam and generating a first detection signal therefrom;
   secondary detection means located outside the secondary portion of the scanning region for detecting the secondary laser beam and generating a secondary detection signal therefrom; and
   phase control means for controlling the secondary scanning rate based on the primary and secondary detection signals.

2. The divisional exposure apparatus of claim 1, in which the phase control means controls the secondary scanning rate based on a phase difference between the primary and secondary detection signals.

3. The divisional exposure apparatus of claim 1, in which the phase control means comprises:
   comparison means for generating a compensation signal based on the primary and secondary detection signals;
   integration means for integrating the compensation signal; and
   control means for controlling the secondary scanning rate based on the integrated compensation signal.

4. The divisional exposure apparatus of claim 1, in which the secondary exposure means comprises:
   secondary laser beam generating means for generating the secondary laser beam;
   a secondary reflection mirror for polarizing the secondary laser beam; and
   secondary drive means for rotating the reflection mirror at a secondary rotation speed such that the polarized laser beam scans along the secondary portion of the scanning region; wherein
   the secondary rotation speed corresponds to the secondary scanning rate; and
   the phase control means controls the secondary scanning rate by controlling the secondary rotation speed.

5. The divisional exposure apparatus of claim 3, in which the secondary exposure means comprises:
   secondary laser beam generating means for generating the secondary laser beam;
   a secondary reflection mirror for polarizing the secondary laser beam; and
   secondary drive means for rotating the reflection mirror at a secondary rotation speed such that the polarized secondary laser beam scans along the secondary portion of the scanning region; wherein
   the secondary rotation speed corresponds to the secondary scanning rate; and
   the control means controls the secondary scanning rate by controlling the secondary drive means according to the integrated compensation signal.

6. The divisional exposure apparatus of claim 3, in which the primary exposure means comprises:
- primary laser beam generating means for generating the primary laser beam;
- a primary reflection mirror for polarizing the primary laser beam; and
- primary drive means for rotating the primary reflection mirror at a primary rotation speed such that the polarized primary laser beam scans along the primary portion of the scanning region; wherein
- the primary scanning rate corresponds to the primary rotation speed; and
- the primary rotation speed is determined according to an externally provided timing signal.

7. The divisional exposure apparatus of claim 1, in which:
- the secondary scanning means scans a plurality of secondary portions of the scanning region with a plurality of laser beams at a plurality of secondary scanning rates based on external provided signals;
- the secondary detection means comprises secondary detectors located outside each secondary portion of the scanning region, where the secondary detectors detect and generate a secondary detection signals for each secondary laser beam; and
- the phase control means controls the secondary scanning rates by comparing the primary detection signal with each secondary detection signal.

8. A divisional exposure apparatus, comprising:
- a photosensitive element;
- a plurality of exposure means each for scanning a portion of a scanning line on a surface of the photosensitive element with a laser beam at a primary scanning rate based on an externally provided signal, where the scanning line is formed in a primary scanning direction;
- drive means for moving the surface of the photosensitive element in a secondary scanning direction at a moving speed, where the secondary scanning direction is orthogonal to the primary scanning direction; and
- slanting means for slanting each of the exposure means such that each laser beam is scanned at a slanting angle from the primary scanning direction towards the secondary scanning direction; wherein
- the scanning angle is determined from the primary scanning rate and moving speed.

9. The divisional exposure apparatus of claim 8 in which the scanning angle is determined according to the following equation:

$$\theta = arctan\ (vt/w)$$

in which is the scanning angle, v is the moving speed, t is the time required for each exposure device to carry out one scanning operation, and w is the width of the portions of the scanning lines scanned by each exposure device.

10. The divisional exposure apparatus of claim 8, in which:
- each exposure device is contained in an exposure device box;
- a first end of each exposure box is rotatably fixed relative to the primary scanning direction;
- a second end of each exposure box is movable relative the primary scanning direction; and
- the slanting means changes the scanning angle by moving the second end of each exposure box relative to the primary scanning direction.

11. The divisional exposure apparatus of claim 10, in which the slanting means comprises:
- screw means for adjusting a distance between the second end of each exposure box relative to the primary scanning direction; wherein
- the screw means are fixed at one end to the second end of the exposure box and at the other end to a fixing surface in a plane containing a line formed in the primary scanning direction; and
- the first end of the exposure box is rotatably attached to the fixing surface by hinge means 12. The divisional exposure apparatus of claim 8, in which:
- the photosensitive element is cylindrical and rotates about the axis of the cylinder;
- the primary scanning direction is along a line parallel to the cylinder axis; and
- the moving speed is the speed at which the surface of the photosensitive element moves.

13. A divisional exposure apparatus, comprising:
- a photosensitive element;
- a plurality of exposure means each for generating an exposure beam for scanning a portion of a scanning line on a surface of the photosensitive element;
- scan portion control means for controlling the exposure means such that the portion of the scanning line scanned by a given exposure means overlaps any adjacent portion of the scanning line scanned by any adjacent exposure means in a double exposure region; and
- exposure beam control means for controlling the exposure means such that cumulative energy of the exposure beams in the double exposure regions is substantially the same as a normal scanning energy of one exposure beam outside a double exposure region.

14. The divisional exposure apparatus of claim 13, in which:
- the energy of an exposure beam that ends in any given double exposure region is decreased to substantially zero in the given double exposure region; and
- the energy of an exposure beam that begins in any given double exposure region is increased to substantially the normal scanning energy in the given exposure region.

15. The divisional exposure apparatus of claim 14, in which:
- the energy of an exposure beam that ends in any given double exposure region is linearly decreased to substantially zero in the given double exposure region in the time that the exposure beam takes to scan the given exposure region; and
- the energy of an exposure beam that begins in the given double exposure region is linearly increased to substantially the normal scanning energy in the given double exposure region in the time that the exposure beam takes to scan the given double exposure region.

16. The divisional exposure apparatus of claim 14, in which an increase rate at which an exposure beam is increased in the given double exposure region is substantially equal to a decrease rate at which an exposure beam is decreased in the given exposure region.

17. The divisional exposure apparatus of claim 16 in which the increase rate and decrease rate are both linear.

* * * * *

UNITED STATES PATENT AND TRADEMARK OFFICE
CERTIFICATE OF CORRECTION

PATENT NO. : 5,107,280
DATED : April 21, 1992
INVENTOR(S) : Tsuyoshi OHASHI et al.

It is certified that error appears in the above-identified patent and that said Letters Patent is hereby corrected as shown below:

On the cover page, in section [75], change "Tsuyoishi" to --Tsuyoshi--.

Signed and Sealed this

Twenty-second Day of June, 1993

Attest:

MICHAEL K. KIRK

*Attesting Officer*      *Acting Commissioner of Patents and Trademarks*